Dec. 31, 1929.  G. J. MEYER  1,741,579
AUTOMATIC PRESSURE COOKER
Filed March 30, 1928  2 Sheets-Sheet 1
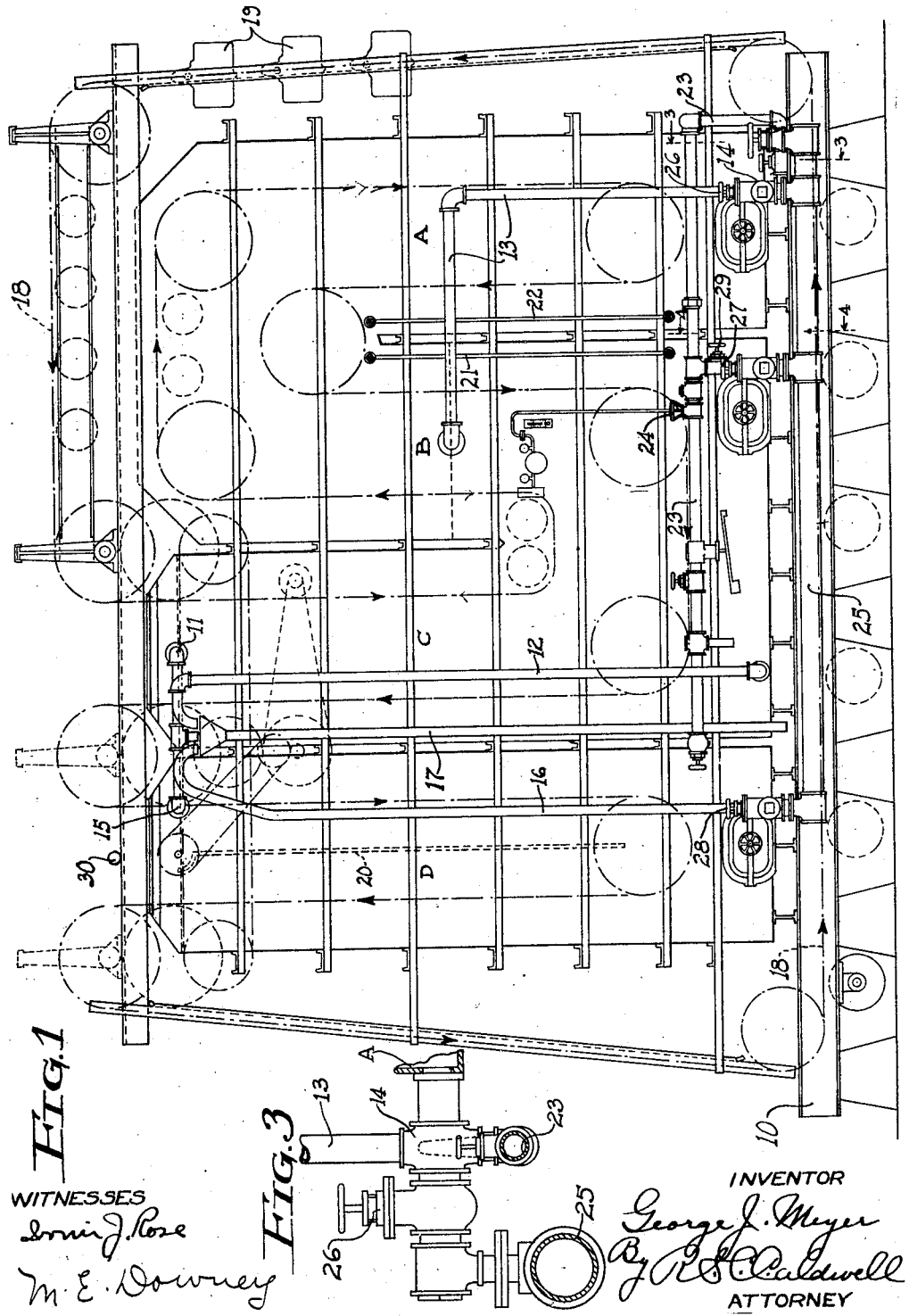

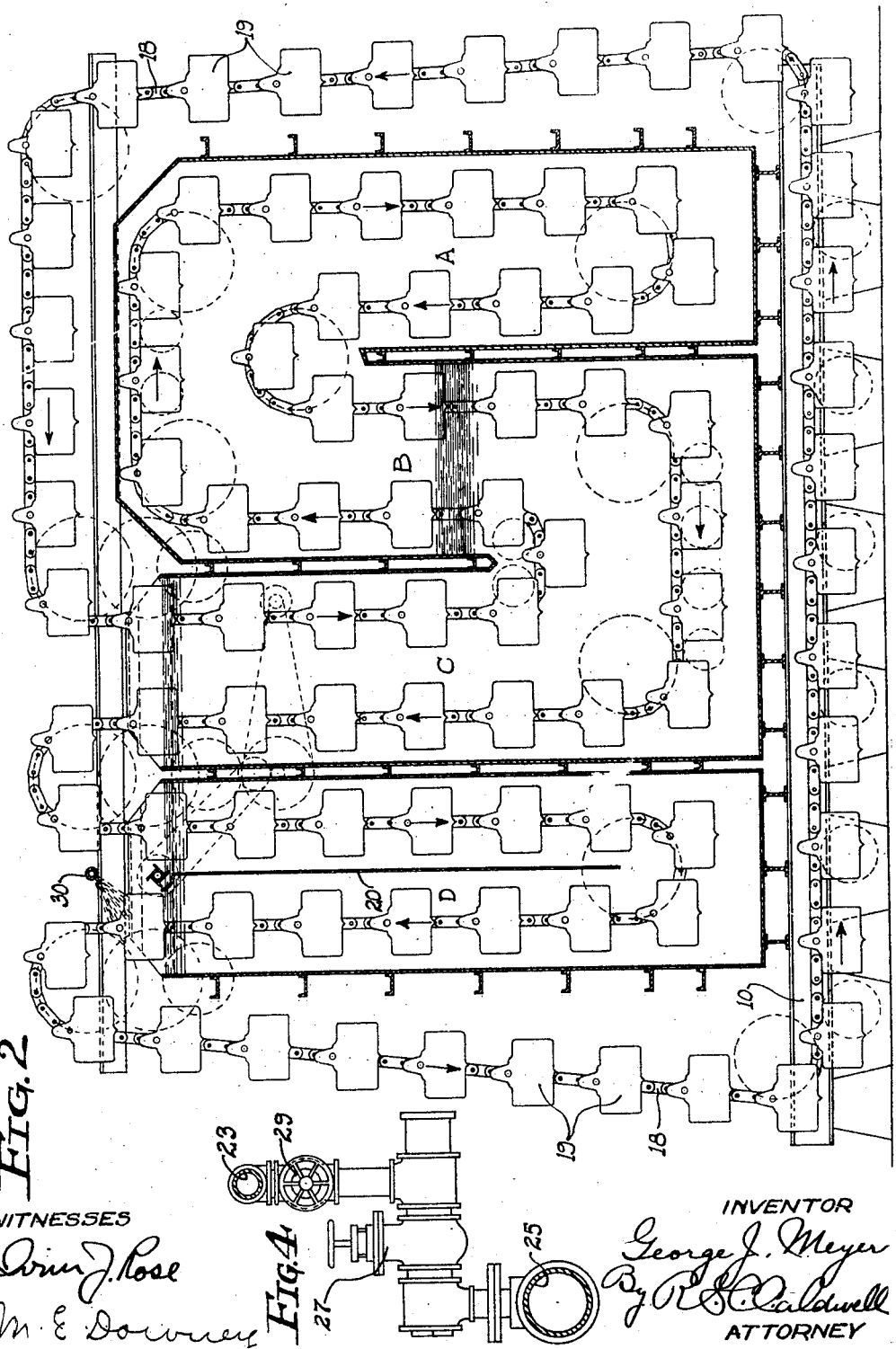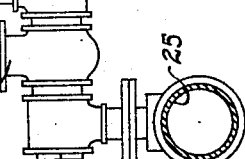

Patented Dec. 31, 1929

1,741,579

UNITED STATES PATENT OFFICE

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN

AUTOMATIC PRESSURE COOKER

Application filed March 30, 1928. Serial No. 266,038.

This invention relates to automatic pressure cookers and has for its object to provide a cooker for bottled or canned goods continuous in its operation, the goods traveling through the cooker on a chain conveyer.

An object of the invention is to provide such a cooker capable of operating at a temperature above boiling by the use of steam under pressure, reliance being placed on a water head to confine the steam under pressure and afford an inlet and outlet passage for the goods.

Another object of the invention is to control the temperature of cooking by varying the water level with varying steam pressure and indicating such temperature conditions by means of a water gage showing the water level.

Another object of the invention is to obtain direct heat transference from the goods leaving the cooker to the goods entering the cooker by close association without intervening obstruction in the same leg or passageway of the tank.

I am aware that it has been proposed to conduct continuous pressure cooking with goods entering and leaving the pressure tank through separate and distant water sealing legs as in the patent to Hunter No. 1,419,139. Also that it has been proposed to pasteurize or sterilize bottled beer and other products by conducting them through tanks containing an air dome adapted to receive compressed air for varying the liquid level of the heating liquid to thereby vary the time of subjecting the goods to the heating influence of the liquid as in the patent to Clasman No. 764,657, but my invention, while pertaining somewhat to the nature of both of these proposals, is different from either or both of them in that variations of liquid level are incident to and relied on for the purpose of controlling variations in steam pressure and consequently the temperature of cooking rather than the time of cooking, and heat transference between incoming and outgoing goods is direct between the goods in the same compartment without intervening obstruction and not relying upon circulation of the water.

With the above and other objects in view the invention consists in the automatic pressure cooker as herein claimed and all equivalents.

Referring to the accompanying drawings, in which like characters of reference indicate the same parts in different views, Fig. 1 is a side view of an automatic pressure cooker constructed in accordance with this invention;

Fig. 2 is a similar view with the tanks sectioned;

Fig. 3 is a sectional view on the plane of line 3—3 of Fig. 1, and

Fig. 4 is a similar view on the plane of line 4—4 of Fig. 1.

In these drawings, 10 indicates a base or support on which are securely mounted four metal tanks A, B, C and D, so related that tanks A and B communicate at their upper ends and are sealed by a common closure, while tanks B and C communicate at their lower ends and tank D is independent and open at its upper end. The upper end of tank C is also open and through it the goods enter and leave the closed compartment formed by tanks A and B. Water is contained in the tanks B and C and in tank D, the water level in tank C being determined by a top overflow 11 near its upper end and a bottom overflow 12 from its lower end, and the level in tank B being determined by the pressure of the steam in the steam dome formed by tank A and the upper part of tank B. Steam is admitted to this steam dome through a pipe 13 from a steam ejector 14, drawing water of condensation from the bottom of tank A and conducting it with the fresh steam to tank B above the water level.

The water level in take D is determined by a top overflow 15 near its upper end and a bottom overflow 16 from its lower end. These overflows 11, 12, 15 and 16 discharge into a funneled waste pipe 17.

An endless chain conveyer 18 provided with bottle carriers 19 is suitably driven and guided to travel through and around the tanks, first traveling upwardly at one end of the machine where the carriers are loaded with bottles of milk or other goods to be sterilized or cooked, and then passing over the machine and down through tank C, then up into the steam pressure cooking chamber, rising in tank B, crossing the steam dome and descending in tank A, then rising in tank A and descending in tank B, crossing over to tank C and ascending in tank C in close proximity to the incoming carriers and then descending in tank D on one side of a central partition 20 thereof and ascending on the other side of said partition and then descending at the other end of the machine where the carriers are unloaded and returning to the first end of the machine by traveling beneath the tanks. The goods are thus introduced to the steam pressure cooking chamber and discharged therefrom through a water seal or valve formed by the water in tank C, the head of water therein being maintained by the pressure of steam in the steam pressure cooking chamber formed by tank A and the upper part of tank B.

The cooking is done at a temperature higher than the boiling temperature of water and consequently is not effective during the travel of the carriers through the water but only during their travel through the steam pressure chamber and, as the temperature of the cooking chamber depends upon the steam pressure, the head of water maintained in tank C will depend thereon. A glass water gage 21 is provided on tank B to show the lever of the water therein. A similar glass water gage 22 is provided for tank A to indicate water lever therein at times when water is allowed to remain.

A common drain pipe 25 is provided for draining all of the tanks having valve connections 26, 27 and 28, with the bottoms of tanks A, B and D respectively, the steam ejector 14 being coupled with connection 26 between the valve and the tank. A valved steam connection 29 is provided between the steam pipe 23 and the connection 27, coupling the said connection between the valve and the tank, whereby steam at a predetermined pressure may be introduced directly to tank B.

While the automatic pressure cooker of this invention is not limited in its scope to any particular size or proportions or the use with any particular goods, the machine illustrated as exemplifying the invention is one designed to sterilize milk at a temperature of 225° Fahrenheit at a speed of about one hundred pint bottles per minute, allowing each bottle twenty minutes exposure to this temperature.

The dimensions of this particular machine over all are twenty-seven feet nine inches long, twenty-two feet high, and ten feet wide. Packages are usually filled hot and are loaded in the carriers at any level between the floor and the top of the machine and travel over the top of tanks A and B and enter the open end of tank C. The temperature of this tank is approximately 180° Fahrenheit, which gradually increases on the way down and, in practice, it is heated by the outgoing bottles traveling close to the incoming bottles and without intervening obstruction to prevent the heat transference from the outgoing bottles to the incoming bottles.

The machine is of such height that the pressure necessary to correspond with the desired temperature is secured by the head of water in tanks B and C, in this instance the head being approximately nine feet.

This water level in tank B is maintained by a pressure of approximately five pounds of steam. In the upper portion of tank B and in all of tank A there is some condensation and in order to maintain the necessary hydrostatic head and to remove the water of condensation from tank A, the steam ejector 14 is used, accomplishing both purposes. It draws the water from tank A and introduces it through pipe 13 with steam at approximately five pounds pressure into tank B above the water line. In the steam pipe 23 supplying the steam ejector 14 is a reducing valve 24, which reduces the steam pressure to approximately five pounds and, as long as this pressure is maintained, the water level is also maintained, as well as the predetermined cooking temperature, in the steam pressure chamber. As long as the water level indicated by the glass water gage 21 is correct, the temperature is also correct.

While traveling through the steam space the packages are subject to the temperature and pressure of the space and the speed of the machine is such that they are so exposed for a predetermined length of time to insure a thorough heating up to the required temperature.

The water in the bottom of tank B and in tank C serves as a valve through which the packages pass from the steam pressure chamber to the atmosphere and, inasmuch as the incoming carriers travel in the opposite direction and close thereto, it is evident that the heat from the outgoing packages is transferred to them directly or through the medium of the intervening water without depending on water circulation, so that the action is practically regenerative. The ingoing bottles are heated by the outgoing bottles and the outgoing bottles are cooled by the ingoing bottles.

Where it is not necessary to cool the bottles below the temperature of 180° or 190° Fahrenheit it is not necessary to use tank D, but, when it is desired to cool the bottles to a lower temperature, this tank is used. Cool water is sprayed from a pipe 30 over the baskets at the outside end of tank D and will flow in a direction counter to the travel of the bottles down to the bottom of the tank and up the inlet side of the tank where the overflow 15 is provided.

The temperature to which the bottles can be cooled depends more or less on the quantity of water used and in many cases it is not necessary at all to cool below 100° Fahrenheit as the high temperature used for cooking or sterilizing is such that all goods can be kept at practically any temperature after leaving tank C.

This apparatus was designed to be used for bottled goods but it can be used for cans, jars, or practically any other container, there being no mechanical devices necessary to valve the package into the closed pressure chamber.

What I claim as new and desire to secure by Letters Patent is:

1. An automatic pressure cooker comprising a cooking chamber containing steam under pressure, a single leg containing water and forming a water seal valve therefor, and a conveyer for the goods to be cooked entering and leaving the steam pressure cooking chamber through said leg, the incoming goods and the outgoing goods traveling in close relation to each other without intervening obstruction for direct heat transference from one to the other through the water whereby the outgoing goods are cooled and serve to directly heat the incoming goods without water circulation.

2. An automatic pressure cooker comprising an inverted U-shaped cooking chamber containing steam under pressure, a U-shaped water leg communicating with one leg of the steam pressure cooking chamber and containing water at a hydrostatic head for sealing the cooking chamber and confining the pressure therein, a conveyer for goods to be cooked entering and leaving the steam pressure cooking chamber through said water leg, and means for discharging water of condensation from the other leg of the steam pressure cooking chamber.

3. An automatic pressure cooker comprising an inverted U-shaped cooking chamber containing steam under pressure, a U-shaped water leg communicating with one leg of the steam pressure cooking chamber and containing water at a hydrostatic head for sealing the cooking chamber and confining the pressure therein, a conveyer for goods to be cooked entering and leaving the steam pressure cooking chamber through said water leg, and a steam ejector for drawing water of condensation from the other leg of the steam pressure cooking chamber and discharging it with the steam in the first mentioned leg of the steam pressure cooking chamber.

4. An automatic pressure cooker comprising an inverted U-shaped cooking chamber containing steam under pressure, a water leg opening to the atmosphere from the lower end of one leg thereof and containing water with a hydrostatic head for confining pressure in the cooking chamber, a conveyer entering and leaving the cooking chamber through the water leg, and means for varying the effective length of the steam dome of the cooking chamber by varying the height of water contained in the other leg thereof.

5. The method of maintaining a predetermined temperature in the inverted U-shaped pressure cooking chamber of a pressure cooker consisting of sealing the open end of said cooking chamber by means of a hydrostatic head, admitting and discharging goods through said hydrostatic head and removing water of condensation from the closed end of the cooking chamber with steam, and introducing said water and steam in the other end of the cooking chamber.

In testimony whereof, I affix my signature.

GEORGE J. MEYER.